US010962399B1

(12) United States Patent
Rumler

(10) Patent No.: US 10,962,399 B1
(45) Date of Patent: Mar. 30, 2021

(54) HYDRATION BLADDER FLUID LEVEL DETECTION SYSTEM AND METHOD OF USE

(71) Applicant: Joseph V. Rumler, Arvada, CO (US)

(72) Inventor: Joseph V. Rumler, Arvada, CO (US)

(*) Notice: Subject to any disclaimer, the term of this patent is extended or adjusted under 35 U.S.C. 154(b) by 246 days.

(21) Appl. No.: 15/970,441

(22) Filed: May 3, 2018

(51) Int. Cl.
| G01F 23/24 | (2006.01) |
| A45F 3/20 | (2006.01) |
| B67D 1/08 | (2006.01) |
| G01F 23/26 | (2006.01) |
| G01F 22/00 | (2006.01) |
| G01F 23/00 | (2006.01) |

(52) U.S. Cl.
CPC .............. *G01F 23/248* (2013.01); *A45F 3/20* (2013.01); *B67D 1/0871* (2013.01); *G01F 22/00* (2013.01); *G01F 23/0007* (2013.01); *G01F 23/245* (2013.01); *G01F 23/261* (2013.01)

(58) Field of Classification Search
CPC ...... G01F 23/248; G01F 22/00; G01F 23/261; G01F 23/245; G01F 23/0007; B67D 1/0871; A45F 3/20
See application file for complete search history.

(56) References Cited

U.S. PATENT DOCUMENTS

| 4,974,500 | A | * | 12/1990 | Boyd | A47B 31/02 221/96 |
| 5,450,067 | A | * | 9/1995 | Wang | G01F 23/0069 340/618 |
| 6,840,100 | B1 | * | 1/2005 | Wotiz | A45F 3/16 222/175 |
| 6,990,860 | B1 | * | 1/2006 | Gillanders | A45F 3/20 222/175 |
| 2010/0175718 | A1 | * | 7/2010 | Kedjierski | G01F 23/247 134/18 |
| 2015/0082882 | A1 | * | 3/2015 | Antocci | G01F 23/18 73/301 |
| 2016/0349095 | A1 | * | 12/2016 | Lazzi | G01F 23/241 |

* cited by examiner

*Primary Examiner* — David Z Huang
(74) *Attorney, Agent, or Firm* — Marshall, Gerstein & Borun LLP

(57) ABSTRACT

A hydration bladder fluid level detection system includes a pack having a hydration bladder removably secured therein; a display in communication with a power source and to attach to the pack, the display having; a high level indicator; and a low level indicator; a detector system, including a high level probe in communication with the high level indicator and to detect fluid at a first level in the hydration bladder; a low level probe in communication with the low level indicator and to detect fluid at a second level in the hydration bladder; and a power supply probe in communication with the power source and to complete an electrical circuit with the high level and low level probes as circuit components; fluid dropping below the first level deactivates the high level indicator by breaking a circuit leg running between the high level probe and the power supply probe; and fluid dropping below the second level deactivates the low level indicator by breaking a circuit leg between the low level probe and the power supply probe.

20 Claims, 6 Drawing Sheets

HYDRATION BLADDER FLUID LEVEL DETECTION SYSTEM AND METHOD OF USE

BACKGROUND

1. Field of the Invention

The present invention relates generally to hydration pack systems, and more specifically, to a fluid level detection and indicator system for hydration bladders.

2. Description of Related Art

Hydration pack systems are well known in the art and are effective means to conveniently carry water (or other liquid) for hydration, such as during a hike. For example, FIG. 1 depicts a conventional hydration pack system 101 having a pack 103 with a body 105 configured to receive a hydration bladder 107 through a sleeve 109 separate from the pack body. Hydration bladder 107 includes a body 111 configured to receive liquid 113 and a drinking tube 115. During use, the user wears pack 103 and drinks through tube 115.

One of the problems commonly associated with system 101 is lack of knowing how much liquid is left. For example, the user does not have any means of knowing the volume of liquid left in bladder 107 other than by estimation of the weight of the pack or by removing the bladder from the sleeve and examining the liquid level. This limitation can be inconvenient during activities such as a long hike, wherein the user needs to evaluate how much liquid is left to make it through the rest of the activity.

Accordingly, although great strides have been made in the area of hydration pack systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
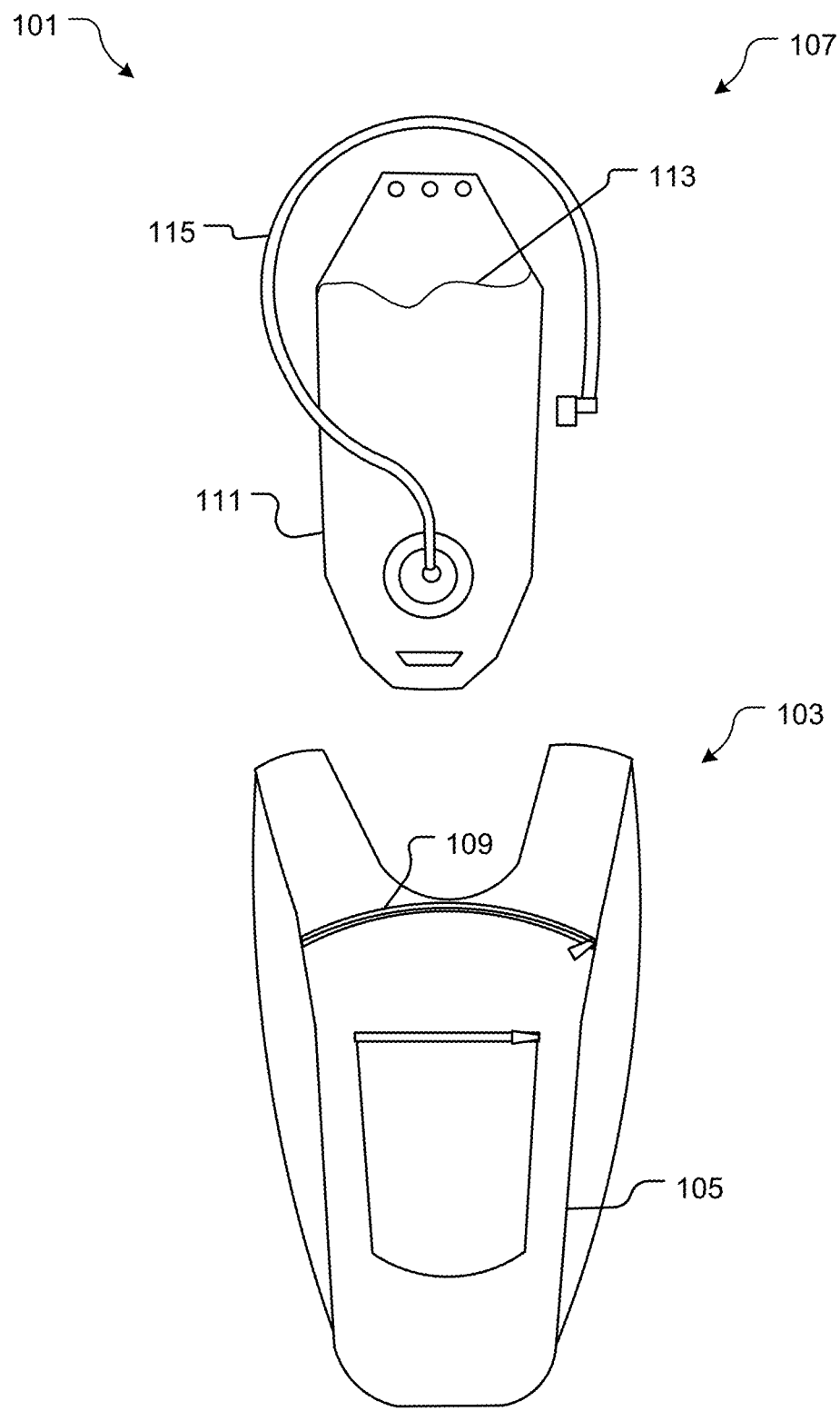
FIG. 1 is a front view of a common hydration pack system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional hydration pack systems. Specifically, the present invention provides a means to detect fluid level within a hydration bladder and provide the user with a visual indication of fluid level. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
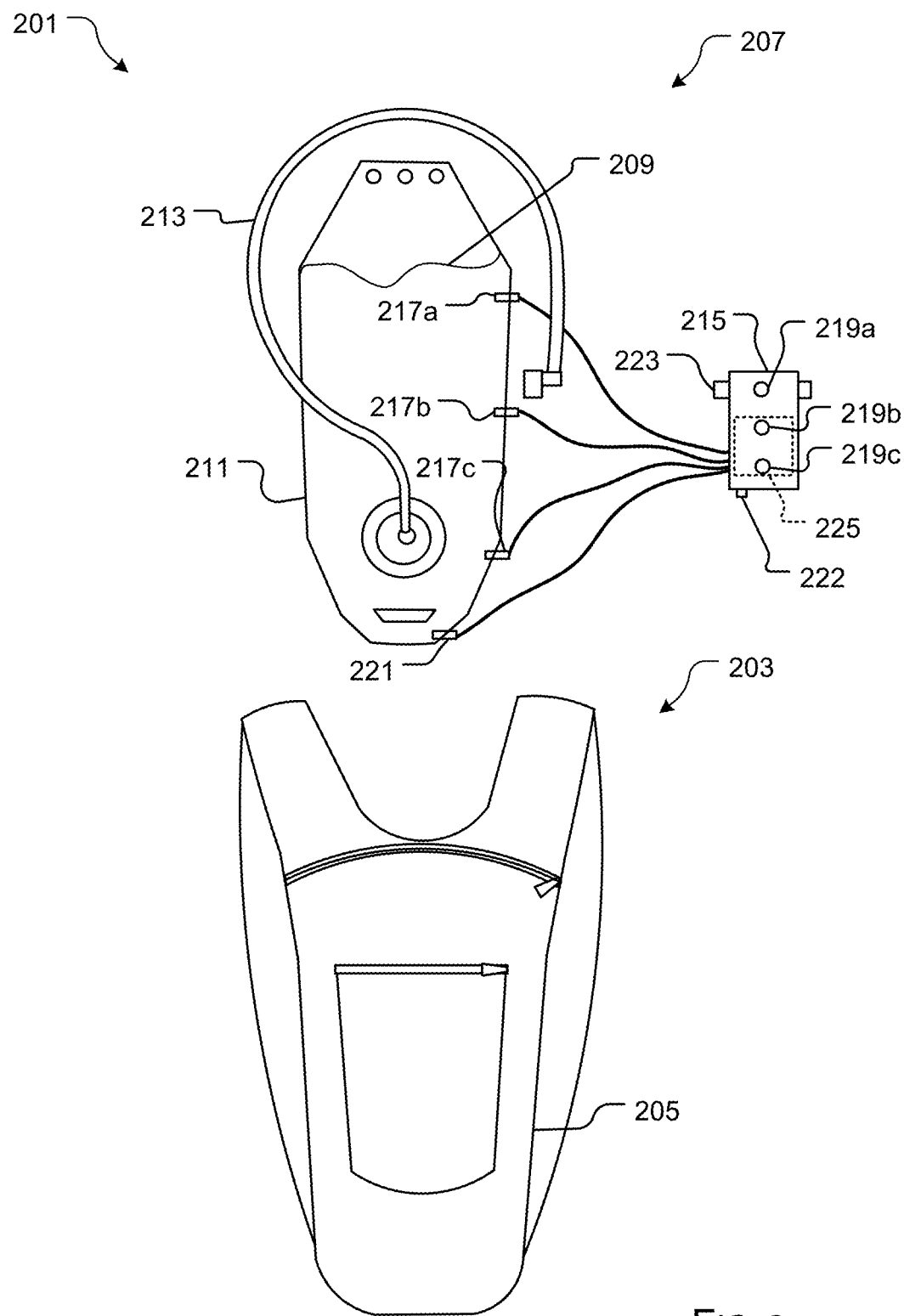
FIG. 2 is a front view of a fluid level detection and indicator system for a hydration bladder in accordance with a preferred embodiment of the present application.

Referring now to the drawings wherein like reference characters identify corresponding or similar elements throughout the several views, FIG. 2 depicts a front view of a fluid level detection and indicator system 201 in accordance with a preferred embodiment of the present application. It will be appreciated that system 201 overcomes one or more of the above-listed problems commonly associated with conventional hydration pack systems.

In the contemplated embodiment, system 201 includes a pack 203 having a body 205 configured to receive a bladder 207 therein. Bladder 207 is configured to hold a liquid 209 within body 211, wherein the user drinks via tube 213. System 201 further includes a display 215 and a detector system configured to detect a level of liquid and provide the user with an indication thereof. In the preferred embodiment, the detector system includes a plurality of level indicator probes 217*a-c* in electrical communication with a plurality of indicators 219*a-c*, wherein the indicators 219*a-c* provide notice to the user of the level of liquid. In one embodiment, the indicators are LEDs, which are activated via a completed circuit between the plurality of probes and a power supply probe 221. In alternative embodiments, audible indications are used in replacement of LEDs, providing the same form and function. Further, it is contemplated that system 201 can further include an audible alert 222 configured to work with the LEDs, in this embodiment, the audible alert 222 can be configured to provide an alert as each LED is deactivated based on circuitry.

It should be appreciated that display 215 can include an attachment device 223 configured to provide a means to secure the display on pack 203. The attachment device 223 could be straps, hooks, clasps, hook and loop fasteners, or the like. In alternative embodiments, the display could be integrally incorporated into the pack 203, such as having any necessary wiring embedded within the pack and the display being integrally secured in such as a way that allows for battery replacement. Display 215 further includes a power source 225 and any other necessary components.

It should be appreciated that one of the unique features believed characteristic of the present application is the use of a plurality of probes to be in communication with a display, wherein the dropping level of liquid cuts off the conduction between the level indicator probes and the power supply probe, therefore, as the liquid drops past each probe, the corresponding indicator is deactivated.

Figure 3A:
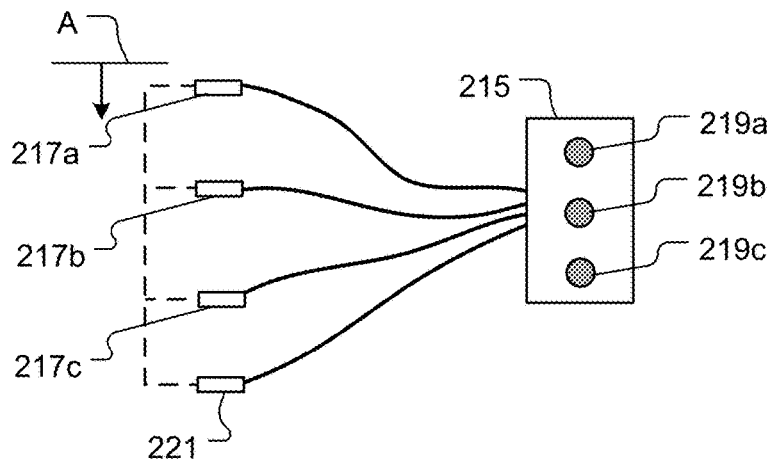
FIGS. 3A-3C are simplified schematics of the use of the fluid level detection and indicator system of FIG. 2.
Figure 3B:
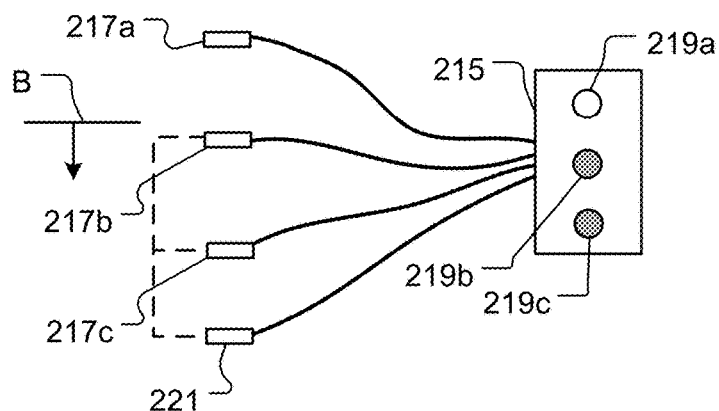
Figure 3C:
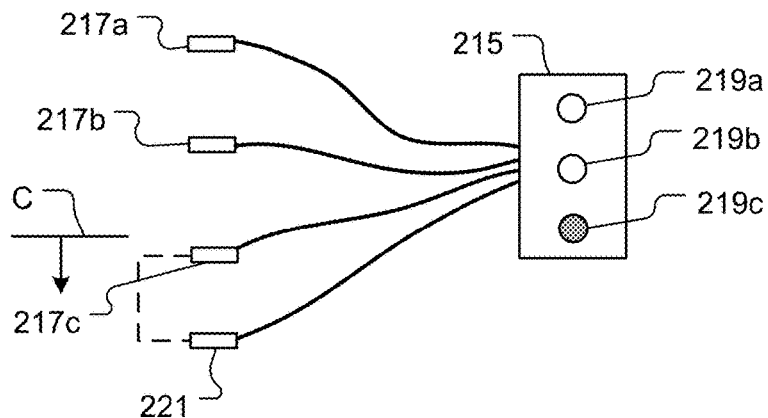

In FIGS. 3A-3C, this mechanism is shown. As the water drops past each level indicator probe, as shown with arrows A-C, the corresponding circuit leg is cut, wherein the corresponding indicator is deactivated, thereby providing the user with a visual indication of the level of fluid in the bladder. It should be appreciated that in some embodiments, the probes are in wireless communication with the display.

Figure 4:
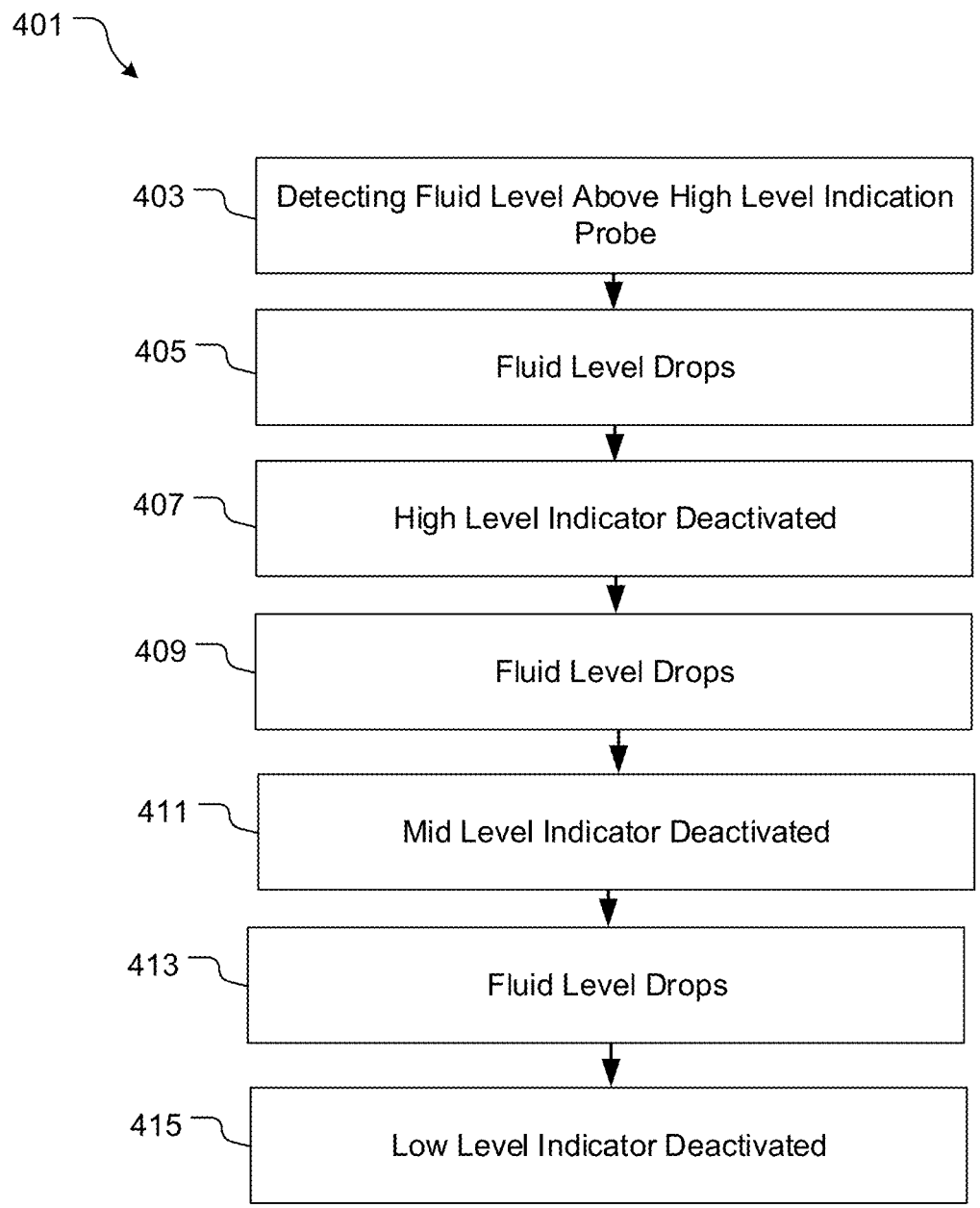
FIG. 4 is a flowchart of the method of use of the system of FIG. 2.

In FIG. 4, a flowchart 401 depicts the method of use of the system of the present invention. The user can proceed with filling the bladder to a desired level. Assuming the user fills the bladder past all probes, all indicators become active due to the completed circuit, as shown with box 403. As the fluid level drops past each of the probes, the circuit legs are cut, wherein the indicators are deactivated, as shown with boxes 405, 407, 409, 411, 413, 415. In some embodiments, the dropping of fluid level past a probe could also be accompanied by an audible indication, thereby further alerting the user as to the fluid level. It must be understood that more or less probes and indicators could be used with the present invention.

Figure 5:
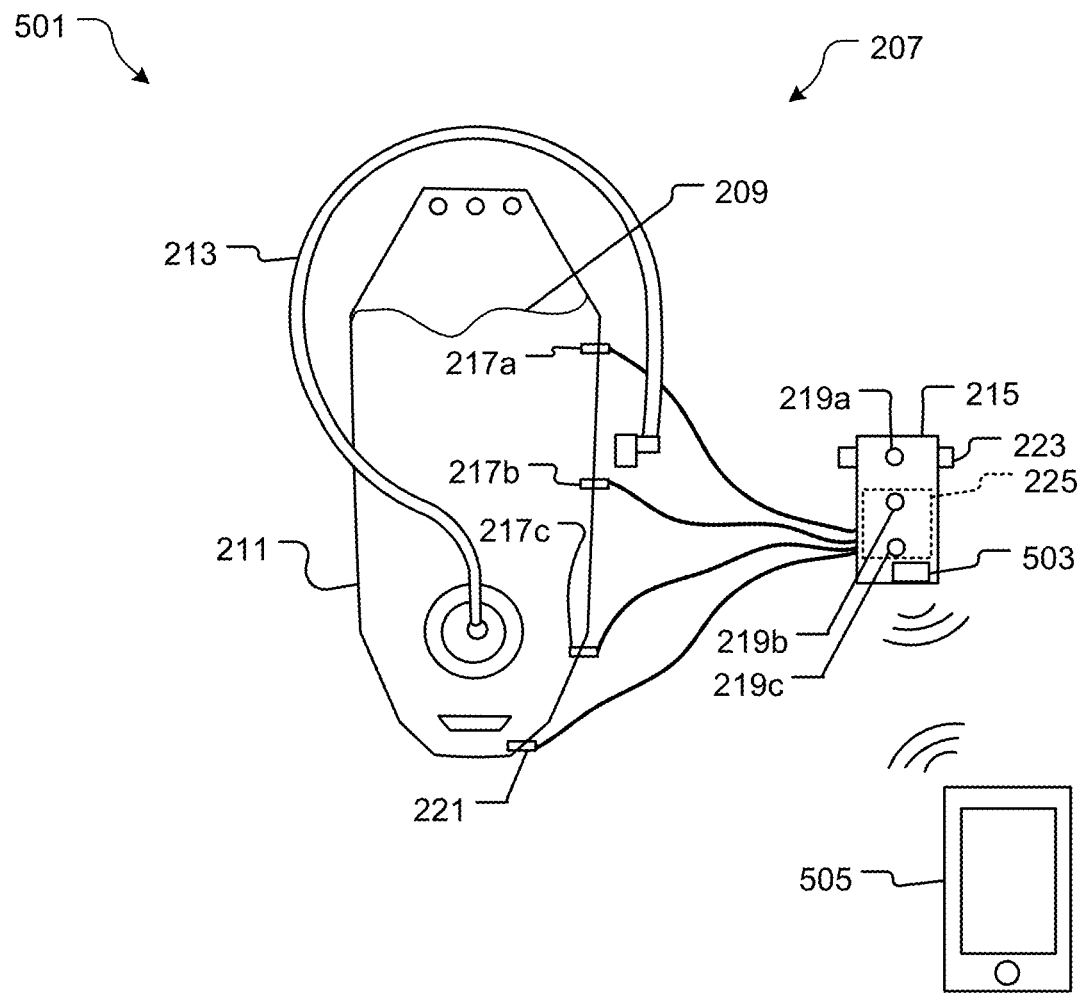
FIG. 5 is a front view of a fluid level detection and indicator system in accordance with an alternative embodiment of the present application.

In FIG. 5, a front view of an alternative embodiment of a fluid detection and indicator system 501 is shown. This embodiment includes all of the features of system 201, and further includes a transceiver 503 configured to wirelessly communicate with a mobile device 505, such as a smart phone, wherein the mobile device provides a visual representation of fluid level.

Figures 6, 7:
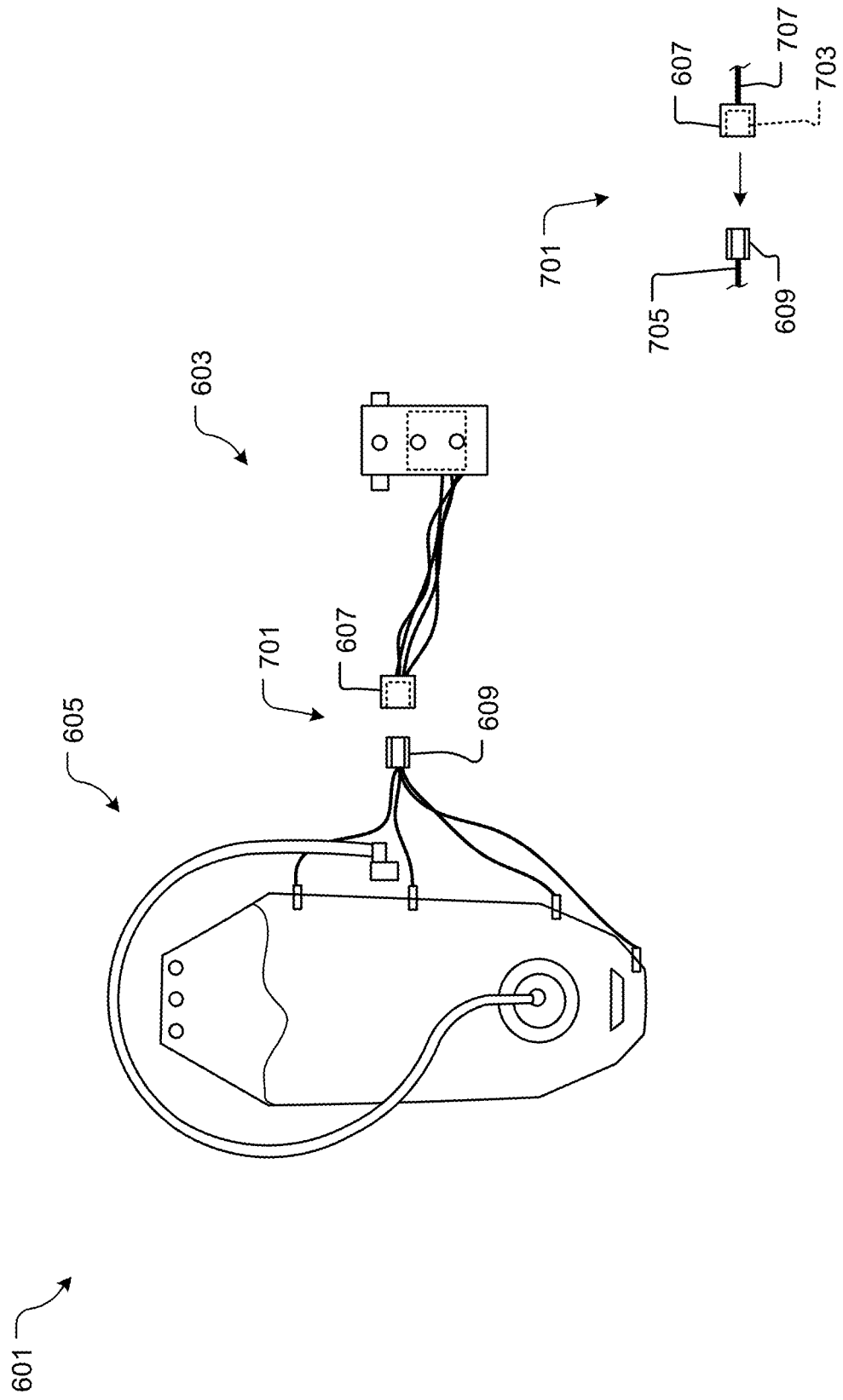
FIG. 6 is a front view of a fluid level detection and indicator system for a hydration bladder in accordance with a preferred embodiment of the present application.
FIG. 7 is a simplified exemplary embodiment of an attachment of FIG. 6.

In FIG. 6, a front view of an alternative embodiment of a fluid detection and indicator system 601 is shown. This embodiment can include all of the features discussed above in connection with systems 201 and 501. In this embodiment, a detection system 603 is configured to removably secure to a bladder 605 via one or more quick connections 701, wherein the one or more quick connections can have a first side 607 and a second side 609. This configuration allows for removal of the detection system 603 without the bladder 207. As shown in FIG. 7, one contemplated configuration includes the first side 607 having a cavity 703 configured to receive second side 609 therein. The connection 701 puts the plurality of wires 705, 707 in electrical communication and further electrically connecting the plurality of probes to detection system 603. It must be understood that any quick connect or wire harness, as is currently known in the art, or developed in the future, could be used to provide the same functionality.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A hydration bladder fluid level detection system, comprising:
   a pack having a flexible hydration bladder removably secured therein, the flexible hydration bladder comprising a flexible body and a drinking tube coupled to the flexible body, the flexible hydration bladder adapted to contain fluid;
   a display in communication with a power source and configured to attach to the pack, the display having:
   a high level indicator; and
   a low level indicator; and
   a detector system in communication with the power source, the detector system including:
   a high level probe in communication with the high level indicator and configured to detect fluid at a first level in the flexible hydration bladder, wherein the high level probe is activated by contact with the fluid;
   a low level probe in communication with the low level indicator and configured to detect fluid at a second level in the flexible hydration bladder, wherein the low level probe is activated by contact with the fluid; and
   a power supply probe in communication with the power source and configured to complete an electrical circuit with the high level probe and low level probe as circuit components;
   wherein fluid at or above the first level activates the high level indicator by completing a first conduction circuit leg between the high level probe and the high level indicator, wherein fluid dropping below the first level deactivates the high level indicator by breaking the first conduction circuit leg between the high level probe and the high level indicator;
   wherein fluid at or above the second level activates the low level indicator by completing a second conduction circuit leg between the low level probe and the low level indicator, and wherein fluid dropping below the second level deactivates the low level indicator by breaking the second conduction circuit leg between the low level probe and the low level indicator; and
   wherein the power source is configured to supply current to the power supply probe and the power supply probe is configured to supply the current from the power source throughout the flexible hydration bladder, wherein when the fluid is at or above the first level, the high level probe receives the current output from the power supply probe, thereby completing the first conduction circuit, and wherein when the fluid is at or above the second level, the low level probe receives the current output from the power supply probe, thereby completing the second conduction circuit.

2. The system of claim 1, wherein the first indicator and the second indicator are LEDs.

3. The system of claim 1, further comprising:
a mid level indicator in communication with a mid level probe configured to detect fluid at a third level in the flexible hydration bladder.

4. The system of claim 3, wherein the mid level indicator is an LED.

5. The system of claim 1, wherein the display further comprises:
a transceiver configured to wirelessly communicate with a mobile electronic device to provide fluid level indication to the mobile electronic device.

6. The system of claim 1, wherein the display is in wired communication with the detector system.

7. The system of claim 1, wherein the detector system further comprises an audible alert.

8. The system of claim 1, wherein the low level probe is configured to detect fluid in the flexible hydration bladder entirely independent of the high level probe.

9. The system of claim 1, wherein the high level probe is deactivated responsive to a lack of contact with the fluid, and wherein the low level probe is deactivated responsive to a lack of contact with the fluid.

10. The system of claim 1, wherein the display comprises an attachment device configured to attach the display on the pack.

11. The system of claim 10, wherein the attachment device comprises a strap, a hook, a clasp, a hook and loop fastener, or a clip.

12. A method of displaying a fluid level in a flexible hydration bladder,
the method comprising:
providing the system of claim 3;
detecting fluid at the first level via a first conduction circuit between the high level probe and the power supply probe;
activating the high level indicator via the first conduction circuit; and
removing a portion of fluid to lower the fluid below the first level, thereby cutting the first conduction circuit leg to deactivate the high level indicator.

13. The method of claim 12, further comprising:
removing a second portion of fluid to lower the fluid below the third level, thereby cutting a third conduction circuit leg associated with the mid level probe to deactivate the mid level indicator.

14. The method of claim 13, further comprising:
removing a third portion of fluid to lower the fluid below the second level, thereby cutting the second conduction circuit leg to deactivate the low level indicator.

15. The method of claim 12, wherein a distance between the high level probe and the low level probe remains fixed during use of the flexible hydration bladder.

16. A fluid level detection system, comprising:
a flexible hydration bladder comprising a flexible body and a drinking tube coupled to the flexible body, the flexible hydration bladder adapted to contain fluid;
a display in communication with a power source and configured to attach to the flexible hydration bladder, the display having:
a high level indicator; and
a low level indicator;
a detector system in communication with the power source, the detector system including:
a high level probe in communication with the high level indicator and configured to detect fluid at a first level in the flexible hydration bladder wherein the high level probe is activated by contact with the fluid;
a low level probe in communication with the low level indicator and configured to detect fluid at a second level in the flexible hydration bladder, wherein the low level probe is activated by contact with the fluid; and
a power supply probe in communication with the power source and configured to complete an electrical circuit with the high level probe and low level probe as circuit components;
wherein fluid at or above the first level activates the high level indicator by completing a first conduction circuit comprising the high level indicator, the high level probe, and the power supply probe, wherein fluid dropping below the first level deactivates the high level indicator by breaking a circuit leg of the first conduction circuit between the power supply probe and the high level probe;
wherein fluid at or above the second level activates the low level indicator by completing a second conduction circuit comprising the low level indicator, the low level probe, and the power supply probe, and wherein fluid dropping below the second level deactivates the low level indicator by breaking a circuit leg of the second conduction circuit between the power supply probe and the low level probe; and
wherein the power source is configured to supply current to the power supply probe and the power supply probe is configured to supply the current from the power source throughout the flexible hydration bladder, wherein when the fluid is at or above the first level, the high level probe receives the current output from the power supply probe, thereby completing the first conduction circuit, and wherein when the fluid is at or above the second level, the low level probe receives the current output from the power supply probe, thereby completing the second conduction circuit.

17. The system of claim 16, further comprising:
a mid level indicator in communication with a mid level probe configured to detect fluid at a third level in the flexible hydration bladder.

18. The system of claim 17, wherein the mid level indicator is an LED.

19. The system of claim 17, wherein the display further comprises:
a transceiver configured to wirelessly communicate with a mobile electronic device to provide fluid level indication to the mobile electronic device.

20. A fluid level detection system, comprising:
a flexible hydration bladder comprising a flexible body and a drinking tube coupled to the flexible body, the flexible hydration bladder adapted to contain fluid;
a power source;
a display in communication with the power source and configured to attach to the flexible hydration bladder, the display having:
a high level indicator; and
a low level indicator;
a detector system in communication with the power source, the detector system including:

a high level probe configured to detect fluid at a first level in the flexible hydration bladder;

a low level probe configured to detect fluid at a second level in the flexible hydration bladder; and a power supply probe in communication with the power source and configured to complete an electrical circuit with the high level probe and low level probe as circuit components;

a first conduction circuit formed only when the high level probe detects fluid at the first level, the first conduction circuit comprising the high level indicator, the high level probe, and the power supply probe; and a second conduit circuit formed only when the low level probe detects fluid at the second level, the second conduction circuit comprising the low level indicator, the low level probe, and the power supply probe;

wherein the power source is configured to supply current to the power supply probe and the power supply probe is configured to supply the current from the power source throughout the flexible hydration bladder, wherein when the fluid is at or above the first level, the high level probe receives the current output from the power supply probe, thereby completing the first conduction circuit, and wherein when the fluid is at or above the second level, the low level probe receives the current output from the power supply probe, thereby completing the second conduction circuit.

* * * * *